Figures 1, 2, 3:
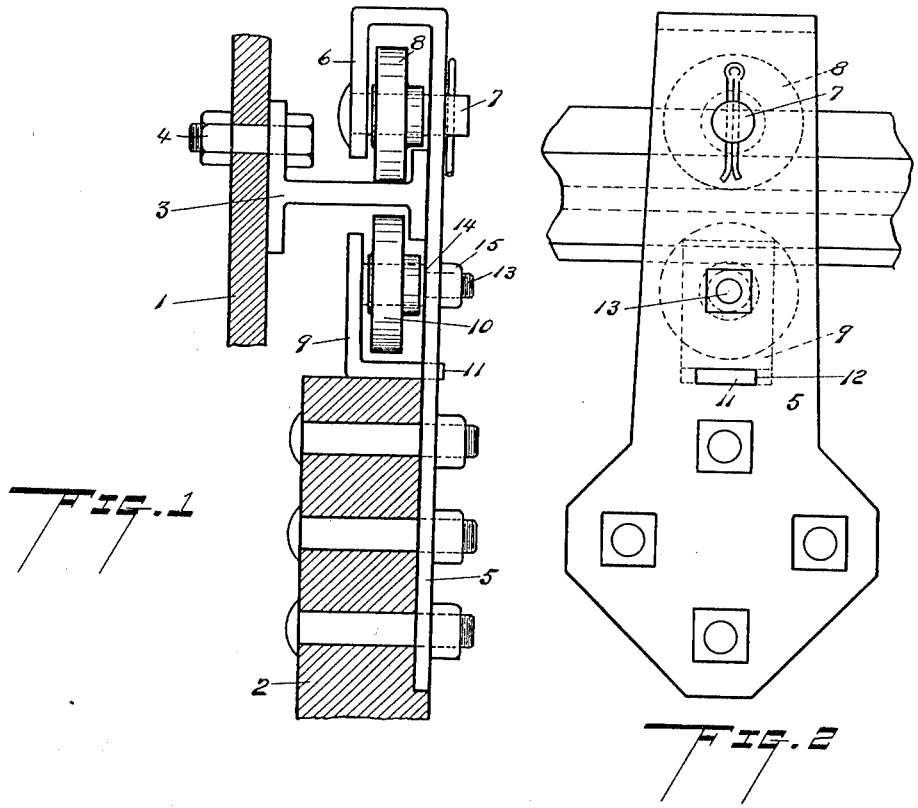

C. C. NELSON.
DOOR HANGER.
APPLICATION FILED APR. 4, 1913.

1,073,509.

Patented Sept. 16, 1913.

WITNESSES:
Nellie M. Angus
Roy Wallis

INVENTOR
Chas. C. Nelson.
BY
Geo. B. Willcox.
ATTORNEY

UNITED STATES PATENT OFFICE.

CHARLES C. NELSON, OF BAY CITY, MICHIGAN, ASSIGNOR OF ONE-HALF TO WILLIAM MATTISON, OF BAY CITY, MICHIGAN.

DOOR-HANGER.

1,073,509.  Specification of Letters Patent.  Patented Sept. 16, 1913.

Application filed April 4, 1913. Serial No. 758,844.

*To all whom it may concern:*

Be it known that I, CHARLES C. NELSON, a citizen of the United States, residing at Bay City, in the county of Bay and State of Michigan, have invented certain new and useful Improvements in Door-Hangers; and I do hereby declare the following to be a full, clear, and exact description of the invention, such as will enable others skilled in the art to which it appertains to make and use the same.

This invention is a door hanger and relates more particularly to that class of door hangers commonly applied to the doors of freight cars.

The objects of the present improvement are to provide a simple and inexpensive, yet strong and durable door hanger that can be easily and quickly detached by car repairers without the necessity of entering the car, all of the necessary fittings for the door hanger being accessible from the outside.

A further object is to provide a strong bracket of simple construction to support the lower wheel of the hanger, the bracket being so constructed that it requires only one fastening bolt.

With these and certain other objects in view which will appear later, the invention consists in the devices described and claimed and the equivalents thereof.

In the drawings, Figure 1 is an end view partly in section, showing the hanger applied to a freight car door; Fig. 2 is a front elevation; and Fig. 3 is a perspective detail of the lower wheel bracket with its trunnion.

In the drawings, 1 represents the car door frame and 2 the sliding door.

3 is the track secured to the frame in any suitable usual manner, as by bolts 4.

The hanger comprises a front plate 5, the lower end of which is bolted to the door 2, the upper end of the plate being bent inwardly and downwardly as at 6 to form a support for the pin 7, upon which the wheel 8 runs. My improved lower wheel support comprises an L-shaped bracket 9, upon which is mounted the lower wheel 10. The horizontal flange of the bracket 9 is provided with a projecting tenon 11 which is received in an opening 12 of plate 5. A pin 13 is rigidly secured to the vertical member of the bracket 9, being preferably cast or forged in one piece with the vertical member of the bracket, and upon this pin is loosely mounted the lower wheel 10. The pin is formed with a shoulder 14 and the reduced end of the pin passes through a hole in plate 5. The threaded end of the pin is provided with a nut 15, by which the bracket 9 is clamped to the plate 5. Preferably the upper edge of door 2 takes under the horizontal flange of bracket 9 to assist in supporting the bracket, as shown in Fig. 1. It will be seen that the bracket 9 and pin 13 form one piece, easily removed from plate 5 by unscrewing the nut 15 and pushing the bracket back toward the car until the tenon 11 and bolt 13 are free of the plate. The bracket 9 and wheel 10 can then be taken out and the door can be removed by merely lifting it from the track 3.

By the means above described I have provided a support for the lower wheel that can be readily attached and removed and that can be clamped in place by a single nut. The shock and jar on the wheel 10 is absorbed by the tenon 11 in the plate 5, and also by the supporting action of the upper edge of door 2, thereby relieving the bolt 13 of all undue shock.

It will be noted that the bracket when in place is held rigidly, and having no movement of adjustment there is no tendency for it to loosen and allow the lower wheel to become displaced.

Having described my invention, what I claim and desire to secure by Letters Patent is:

1. A door hanger comprising in combination with a track, a hanger plate having an upper wheel adapted to roll on said track, an L-shaped bracket having one flange formed with a tenon, a bolt rigidly secured to the other flange of said bracket, a wheel loosely mounted on said bolt, said bolt formed with a shoulder and having its free end threaded; said plate formed with an opening to receive said bolt and a second opening to receive the tenon of said bracket, for the purposes set forth.

2. A door hanger comprising in combination with a track, a hanger plate having an upper wheel adapted to roll on said track, an L-shaped bracket having one flange formed with a tenon, a bolt formed integral with and projecting outwardly from the other flange of said bracket, a wheel loosely mounted on said bolt, said bolt formed with a shoulder and having its free end threaded; said plate formed with an opening to receive said bolt and a second opening to receive the tenon of said bracket.

In testimony whereof, I affix my signature in presence of two witnesses.

CHARLES C. NELSON.

Witnesses:
NELLIE M. ANGUS,
ROY WALLIS.

Copies of this patent may be obtained for five cents each, by addressing the "Commissioner of Patents, Washington, D. C."